July 29, 1958

H. LÜHR 2,845,140

FILTER SET FOR DUST-FILTER-PLANTS

Filed July 22, 1954

INVENTOR:
HEINRICH LÜHR

BY
Richardson, David and Nardon
ATTYS

July 29, 1958  H. LÜHR  2,845,140
FILTER SET FOR DUST-FILTER-PLANTS
Filed July 22, 1954  2 Sheets-Sheet 2
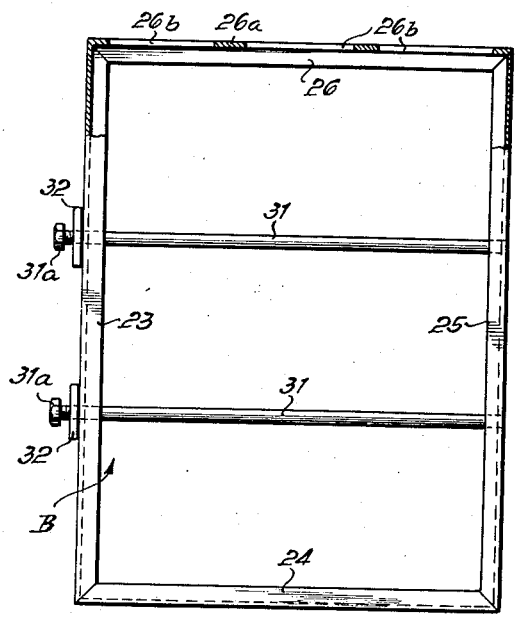
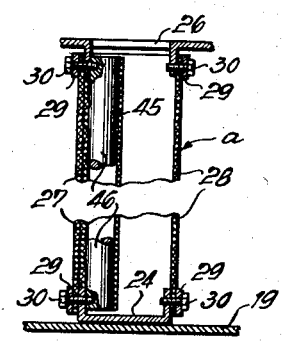
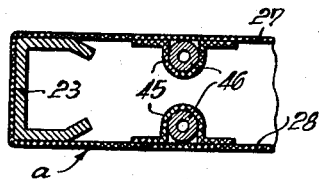
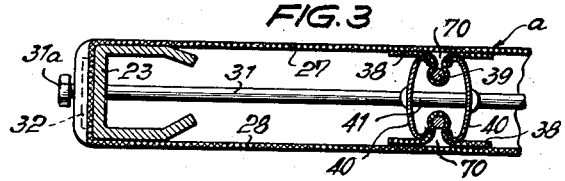
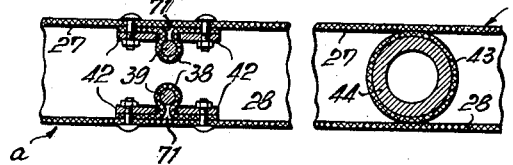
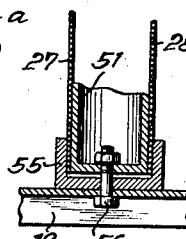
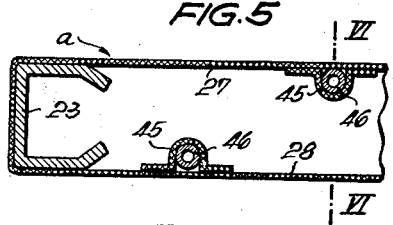
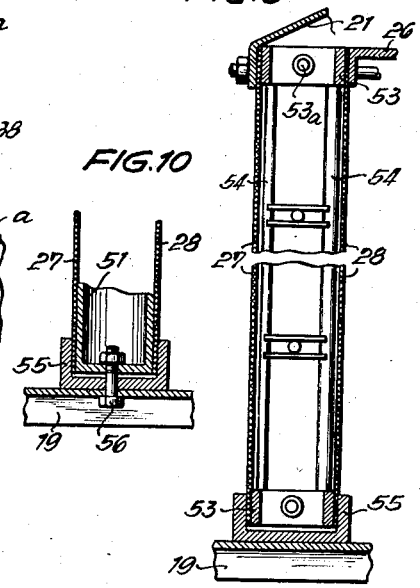
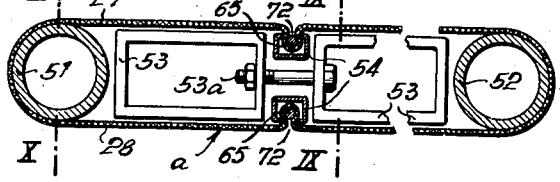
INVENTOR:
HEINRICH LÜHR United States Patent Office 2,845,140
Patented July 29, 1958

2,845,140

FILTER SET FOR DUST-FILTER-PLANTS

Heinrich Lühr, Hannover, Germany

Application July 22, 1954, Serial No. 445,066

8 Claims. (Cl. 183—54)

The present invention relates to dust-filter-plants provided with a plurality of filter chambers arranged behind one another or in parallel rows, and in which flat filtering sheets are arranged which are traversed in one direction by the dust-laden gas or air, and in the opposite direction periodically by counter-currents of scavenging air or gas, whereby the scavenging air or scavenging gas carries off the dust adhering to the filtering sheets, which thereupon is conveyed either mechanically or pneumatically to a desired place, and whereby the removal of the dust from the filtering sheets is preferably aided by slackening and tensioning of the filtering sheets.

Known dust-filter-plants of this type have the drawback that the arrangement of the filtering sheets has to be effected within the filter chambers, which causes considerable difficulties when torn or otherwise damaged filtering sheets have to be exchanged. Another disadvantage of known filtering plants resides in the feature that the filtering sheets can not be arranged closely enough together, as the fabric of the filtering sheets tends to bulge or slacken, particularly because it is traversed during the dust-filtering and during the dust-removal by the dust-laden gas and the scavenging air or gas, respectively, in two opposite directions. Furthermore, the assistance given to the dust-removal through slackening and tensioning has its disadvantageous effects, particularly in cases where the filtering sheets consist of glass tissues or synthetic tissues which are capable of resisting high temperatures, but which are very brittle, so that the aforementioned dust-removal by means of slackening and tensioning results in quick destruction of the filtering sheets.

The object of the invention is to devise the filter plant in such manner that in the individual filter chambers a very considerable area of filtering sheets can be accommodated in the smallest possible space, and that the assembled filter sets can be exchanged as units, and that the individual filtering elements forming a filter set can easily and conveniently be exchanged outside the casing of the filter chamber.

Another object of the invention is to provide the filter-sheets, which are arranged parallel to one another with small intervening spaces between them, with supporting means or tensioning means throughout their entire width in such a way that bulging of the filtering sheets in inward and outward direction is thereby reliably prevented.

In conformity with the aforesaid objects, the invention resides principally in the feature that each filter set for the plurality of separate filter chambers forming the filter plant, consists of a plurality of filtering elements which are each composed of two flat filtering sheets fastened in outstretched condition on a frame; which are traversed in the direction from without toward within by the dust-laden gas or air; which are open at their upper end; whose interior is connected via that open upper end with the purified gas or air removal pipe; and which can be installed as a detachable rigid unit in every filter chamber; that, furthermore, the plurality of filtering elements of a filter set are covered up by a common hood which is connected with the purified air or gas removal pipe and with a scavenging air or gas supply pipe; and that the flat filtering sheets of every filtering element are supported and tensioned on their inside by a plurality of supporting members uniformly distributed over the entire width of the filtering element and extending from the top to the bottom of the filtering element, preventing in this way the bulging of the filtering sheets resulting from the pressure exerted against them in alternate direction by the currents of dust-laden gas or air and the currents of scavenging gas or air.

The plurality of filter chambers are, for the purpose of exchanging the entire filter sets, preferably each provided with a tightly closing door whose size corresponds at least to the height and width of the exchangeable filter set.

The feature that the filter set forms a rigid unit, renders it possible that the filtering sheets may consist not only of the customary textile fabric, but also of spun glass, synthetic fabric or other filtering material which is capable of resisting temperatures of over 100 degrees centigrade, so that the filter plant can also be used for the removal of dust from hot gas without incurring the risk of breaking or crumbling of the filtering sheets. Even when comparatively easily broken filtering material of this type is used, it is possible to effect the cleaning not only by means of the current of scavening gas or air, but also through simultaneous lifting and dropping of the entire filter set, whereby the procedure may preferably be such that every filter set is elastically suspended in the filter chamber and provided with a supporting bail which is alternately lifted and dropped during its cleaning period by means of an endless chain arranged on the top of the filter chamber and provided with tooth-shaped lifting members.

Additional features and advantages of the invention will be understood from a consideration of the following detailed description taken in connection with the accompanying drawings, forming a part of this specification and in which an embodiment of the invention has been shown by way of example. However, I wish to say that the invention is not confined to any strict conformity with the showing of the drawings, but may be changed or modified, so long as such changes or modifications mark no material departure from the salient features of the invention as expressed in the appendix claims.

In the drawings:

Fig. 2 is a side elevation, partly in section, of the frame of a filtering element;

Fig. 3 is a horizontal section, on an enlarged scale, of a portion of a filtering element;

Fig. 3a is a sectional detail view, on an enlarged scale, of a modified form of construction of the supporting means of the filtering sheets;

Fig. 4 is a sectional detail view of another modified form of construction of the supporting means for the filtering sheets;

Fig. 5 is a sectional detail view of still another form of arrangement of the supporting means for the filtering sheets;

Fig. 6 is a vertical section of a filtering element on line VI—VI of Fig. 5;

Fig. 7 is a sectional detail view of still another form of arrangement of the supporting means for the filtering sheets;

Fig. 8 is a horizontal section of a modified form of construction of the frame of a filtering element;

Fig. 9 is a vertical section of a filtering element on line IX—IX of Fig. 8;

Fig. 10 is a fractional sectional view of the lower end of a filtering element on line X—X of Fig. 8.

Figure 1:
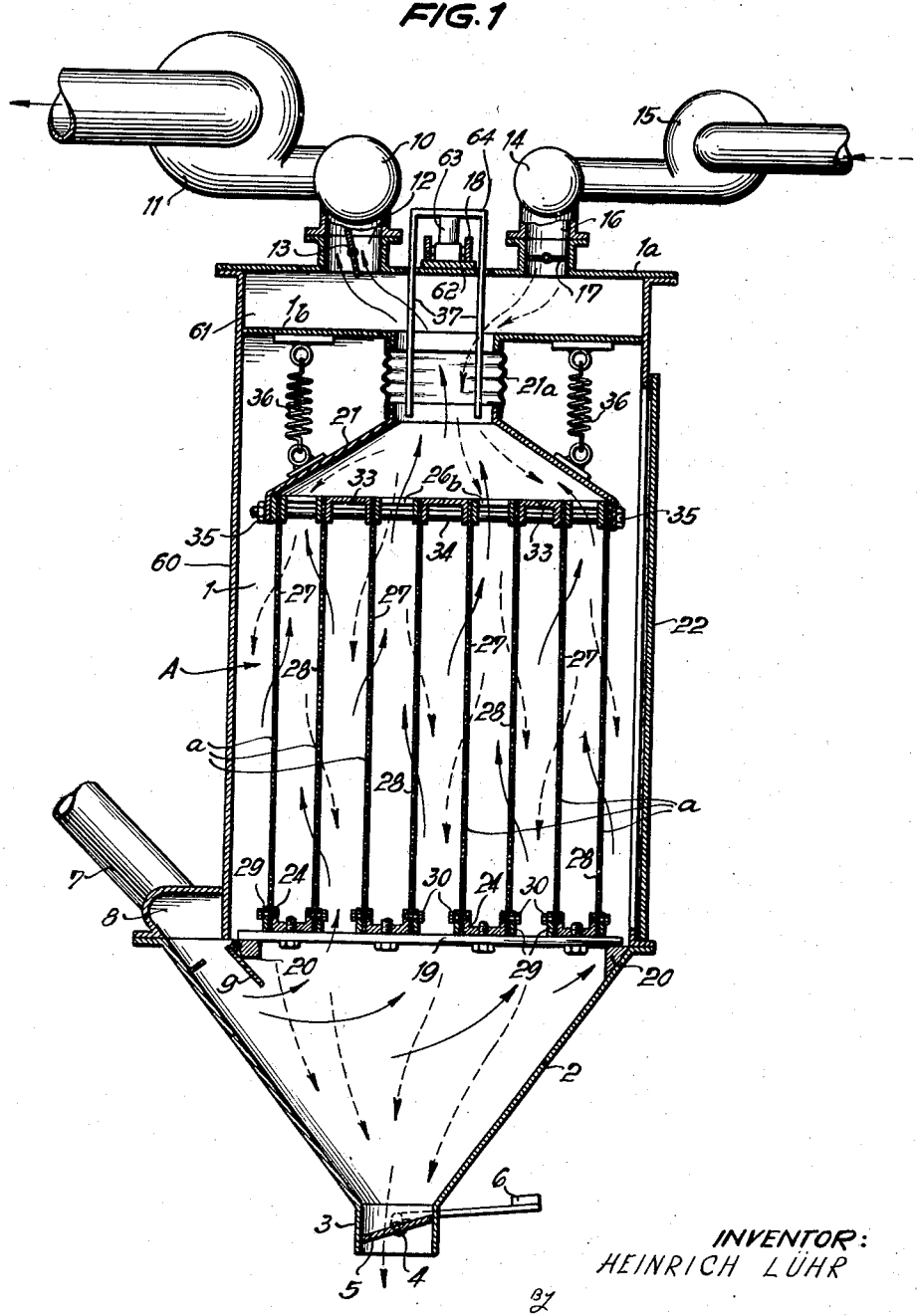
Fig. 1 is a vertical section of a filter chamber, showing the filter set provided with a dust collecting compartment and a hood and suspended from the top of the chamber by means of springs.

The filter plant may consist of a single unit or of several substantially identical adjacent units provided with common accessories such as actuating mechanisms and gas collecting or distributing ducts. Fig. 1 shows a cross-section of one of such units of a dust-filter-plant, consisting of a chamber 1 formed by casing 60 and mounted on a lower compartment or funnel 2. The funnel 2 opens at the lower end into the discharge pipe 3 in which is pivotally suspended for rotation about the pivot 4 a flap 5 provided with balance weight 6. For all chambers arranged behind one another is provided a common dust-gas delivery pipe 7, from which the dust-gas travels through a channel 8 and via a flap 9 into the funnels 2. A collecting pipe 10 is connected to a suction fan 11. The collecting pipe 10 is connected to upper chamber 61 by means of exhaust pipes 12 and each of the exhaust pipes 12 is provided with a flap 13, rotary slide valve or the like for its closing. The plant further includes a distributing pipe 14 which likewise extends across all of the chambers 1 and which is connected with a small fresh air ventilator 15, serving as scavenging air or gas ventilator. The distributing pipe 14 is connected to each upper chamber 61 by means of individual supply pipes 16. Supply pipes 16 are likewise provided with closing flaps 17 or rotary slide valves. In addition to this, the plant is provided with an endless chain 18 guided in guiding means 62 on the continuous cover 1a for all of the chambers 1 arranged in a row, and which at the ends of the row of chambers is guided around guide wheels not shown and rotated at low speed by an electromotor not shown. The endless chain 18 is provided with teeth 63, extending over a portion of its length not exceeding the width of one chamber, which are so shaped that its forward edge forms an ascending surface, while the trailing edge extends in a direction vertical to that of the cover 1a of the chambers. Further particulars regarding the object of this endless chain will be given hereinafter.

Loosely arranged in every chamber 1 of the filter plant is a rigid filter set A, which is assembled from a plurality of individual filtering elements a, and is supported by means of bases 19 on supports 20 of the filter chamber. The entire rigid filter set, which at its upper end is closed up by a hood 21, which communicates with upper chamber 61 can be introduced into or removed from the filter chamber as a combined unit through a door 22, so that it is possible to assemble the filter set A and to exchange the filtering elements a and the filtering sheets outside the filter chamber.

Every filtering element a of the filter set A consists of a rectangular frame B of U-shaped bars having their flanges extending in inward direction. The U-shaped bars 23, 24, 25 and 26 forming the rectangular frame B (see Fig. 2) are welded together at their corners and may consist of iron or of light metal. The upper transversely extending portion 26 of the frame B is so devised that its web 26a is either entirely cut away or provided with openings or slots 26b. Because of the aforesaid removal of the web 26a from the upper transversely extending portion 26, or because of the provision of openings or slots 26b in the web 26a, the inner space of the frame B, which on both sides is covered up by the filtering sheets 27 and 28, is open only at the top. The filtering sheets 27 and 28 may have their marginal portions fastened on both sides of the frame B to the flanges of the U-shaped bars 23 to 26, for example in such manner that against the outer surfaces of the flanges flat-iron fastening members 29 are placed (see Fig. 6) which then are pressed, with the filtering material interposed between them and the flanges, against the flanges of the U-shaped bars preferably by means of screws and nuts 30. It is also possible to proceed in such a way that a filtering hose, which is open at the top and at the bottom, is tightly pulled from above onto the laterally disposed U-shaped bars 23 and 25, in which case merely the upper and lower marginal portions of the hose are secured in position by means of flat-iron members and screws at the flanges of the upper and lower U-shaped bars 24 and 26 of the frame B. If necessary, an additional tightening of the filtering sheets may be effected by means of special tightening rods 31 (see Fig. 2). The tightening rods 31 rest at one of their free ends against the inner web surface of the U-shaped lateral bar 25, and have their opposite free ends engage in bores of the opposite U-shaped bar 23. At their latter ends, the tightening rods 31 are provided with a threaded portion, and this threaded portion engages in a threaded nut 32 positioned either on the outside or inside of the U-shaped bar 23. The rods 31 are further provided with a cap 31a having the shape of a screwhead, so that through rotation of the rods 31 the distance between the U-shaped bars 23 and 25 can be increased, to thereby achieve a corresponding tightening of the filtering sheets 27 and 28.

The aforedescribed filtering elements a are then combined to form the filter sets A, whereby the transversely extending lower bars 24 of the individual filtering elements are fastened by means of screws on the base 19 at uniform distances from one another (see Fig. 1). Then, U-shaped spacing members 33, corresponding in width to the width of the distance between the lower bars 24 and in length to the width of the frame B, are arranged in the intervening spaces between the transversely extending upper bars 26. And then, bolts 34 are pushed through bores in the flanges of the U-shaped upper transverse bars 26 and in the flanges of the U-shaped spacing members 33. After this the hood 21 is placed on the filter set. And, finally, the bolts 34 are tightened by means of the nuts 35, so that the flanges of the U-shaped transverse bars 26 and the flanges of the U-shaped spacing members 33 tightly rest against one another. In this case it is also possible to omit the upper flat-iron members 29 of Fig. 6. The filter set thus produced is then introduced via the door 22 into the filter chamber, whereupon an elastic sleeve 21a is slipped at one end onto the connecting branch of the hood 21 and at its other end onto a connecting branch of an intermediate cover 1b which forms the floor of upper chamber 61. In addition to this, the entire filter set is suspended from the intermediate cover 1b by means of tension springs 36 of such power that they counterbalance a portion of the weight of the filter set. Instead of employing tension springs, it is also possible to use pressure springs, which then, of course, have to be arranged underneath the filter set. The filter set A is further provided with a rigid U-shaped bail 37 which by means of its transversely extending portion 64 embraces one arm of the endless chain and its guiding means within reach of the aforesaid toothing of the chain.

The plant operates as follows: When the chamber is set for the removal of dust from gases, the flap 13 of the dust-removal ventilator 11 is open, while the flap 17 for the admission of scavenging gas or air from the ventilator 15 is closed. Because of the ventilator 11, the dust-laden gas flows via the pipe 7 and the distributing channel 8 at low pressure into the filter chamber (see full-line arrows). The dust-laden gas traverses the filtering sheets 27 and 28 of every filtering element a in the direction from without toward the interior of the chamber, leaves the chamber through the openings 26b at the top, and passes via the hood 21 and the sleeve 21a in purified condition into upper chamber 61 and through the exhaust pipe 12, the collecting pipe 10, and via the suction ventilator 11 into the open air or to a desired place. During this dust removal action, because of the pressure.

differential across them and the balance weight 6, the flap 9 opens automatically, while the flap 5 automatically closes. After a predetermined time of operation, during which a certain quantity of dust has been deposited on the outer surfaces of the filtering sheets 27 and 28, a cleaning of the filtering sheets is necessary. This cleaning of the individual filter chambers is usually periodically effected for all of the filter chambers in succession. For this purpose, the flap 13 of the chamber to be cleaned has to be closed, while the flap 17 has to be opened, so that scavenging gas enters the upper chamber 61, the hood 21, and openings 26b in reversed direction of flow and traverses the filtering sheets 27 and 28 in the direction from within the chamber toward the outside of the latter (see dash-line arrows). Simultaneously with the opening of the flap 17, the toothing of the rotating chain 18 moves into contact with the transverse portion 64 of bail 37 of the filter set A, with the result that the bail 37 and the filter set A fastened to it, are lifted up by the toothing for several millimeters and then permitted to drop, so that the filtering sheets are thereby subjected to a certain degree of rocking or knocking. The consequence is that the dust loosens at the filtering sheets, is carried off by the current of scavenging gas, and passes via the discharge pipe 3 into a mechanical or pneumatic transfer device of any suitable kind. During the scavenging period and the resulting overpressure in the chamber 1, the flap 5 opens automatically under the weight of dust and the effect of said over-pressure, while the flap 9 automatically closes in reaction to the pressure differential across it.

As the flat filtering sheets 27 and 28 of the several filtering elements a are traversed during the filtering and the scavenging in opposite directions, as hereinbefore described, it is necessary to provide the filtering sheets with stiffening means or supporting means in order to prevent bulging or slackening of the sheets. For this purpose the invention proposes to provide the filtering sheets 27 and 28 with pockets or sleeves 38 sewed onto their inner surfaces, as shown in Fig. 3. These pockets 38 may consist of the same material as the filtering sheets 27 and 28, or of different material, which, however, has to be of a highly heat-resisting kind, provided that the filtering sheets 27 and 28 likewise consist of highly heat-resisting fabric, such as spun glass, synthetic fabric or the like, and are acted upon by dust-gas of high temperatures. These pockets 38 are pulled in loop-like fashion through oppositely disposed pairs of slots 70 between pairs of supporting members 40 extending from the top to the bottom of the filtering element, and into each of the loops is inserted from the top to the bottom a rod or retaining means 39 of such diameter that retraction of the loops through the slots is thereby prevented (see Fig. 3). In the form of construction of Fig. 3 the supporting members consist of elongated dish-like members 40 secured to each other by rivets 41 and forming between their beaded edges the aforesaid pairs of slots. In the modification of Fig. 3a, simple flat-iron members 42 have taken the place of the dish-like members 40, whereby the pockets or loops 38 are pulled through longitudinally extending slots 71 in the flat-iron members and secured in position by rods or retaining means 39. Supporting means of this kind for the filtering sheets 27 and 28 are distributed, in accordance with the type of filtering material used and with the strain to which the material is subjected, over the entire width of the filtering elements.

In the form of construction of Fig. 4, a hose 43 of fabric or some other material has been substituted for the pockets 38 and fastened to the filtering sheets 27 and 28 through sewing, and the diameter of the hose 43 corresponds to the distance between the filtering sheets 27 and 28. Extended through the hose 43 from the top to the bottom is a tube 44, whereby again supporting means for the filtering sheets at desired distances from each other are provided.

In the modification of Figs. 5 to 7, the inner surfaces of the filtering sheets 27 and 28 have likewise been provided with pockets 45, which are either oppositely arranged or displaced with respect to each other. Extended through these pockets from top to bottom are again thin tubes 46, which then serve as supports for the filtering sheets. In order to prevent the filtering sheets 27 and 28 provided with the pockets and supporting tubes from swinging, it is advisable to fasten the tubes at their upper and lower ends to the flanges of the transversely extending frame-bars 24 and 26 of the filtering elements (as shown in Fig. 6), whereby the screws employed for tightening the flat-iron fastening members 29 may simultaneously serve for the fastening of the tubes 46. It is, of course, understood that the pockets 38, 43 or 45 can also be fastened to the inner faces of the filtering sheets in any other suitable manner, for example by means of adhesives.

Instead of employing a frame B for the filtering elements a, it is also possible as shown in Figs. 8, 9 and 10, to form the frame by means of two vertical tubes 51 and 52, and to pull the filtering sheets 27 and 28 in the shape of a hose onto these tubes. Arranged between the two parallel tubes 51 and 52, at the upper and lower ends of the latter, is a plurality of boxes 53 which are open at the top and at the bottom, and which are secured to one another by means of threaded bolts and nuts 53a, and between which supporting members 54 are clampingly secured in position. Into these supporting members 54, the filtering sheets 27 and 28, or pockets sewed onto the filtering sheets, are pulled in loop-like fashion through slots 72 in members 54 and secured in position by means of retaining means or holding rods 65, as shown at 39 in Figs. 3 and 3a. As the boxes 53 are open at the bottom, the entire frame is pushed at its lower end into the U-shaped members 55, whereupon the U-shaped members 55 are again screwed onto the base 19. In order to make it possible to pull the frames tightly into the U-shaped members 55, the tubes 51 and 52 are closed up at their lower ends by a plate, through which extends a threaded bolt 56, so that through tightening of the bolts 56 the lower ends of the tubes 51 and 52, and consequently also the boxes 53, can be tightly seated in the U-shaped members 55.

What I claim as new and desire to secure by Letters Patent of the United States is:

1. In a filter, a filter element comprising a frame, at least one fabric sheet supported by said frame, a support means supported by said frame adjacent said sheet and defining a longitudinally extending slot adjacent said sheet, said sheet being provided with a longitudinally extending looped portion extending through said slot, and retaining means for preventing withdrawal of said looped portion through said slot, whereby said sheet is restrained from flexing.

2. A filter as defined in claim 1, wherein said looped portion of said sheet comprises a longitudinally extending sleeve through which said retaining means passes.

3. In a filter for cleaning dust-laden gas, a filter element comprising a frame provided with an open area, a fabric sheet supported by said frame across said open area, means for adjusting said frame to increase at least one dimension of said area, a support means supported by said frame adjacent said sheet and extending transversely of said adjustable dimension, said support means defining a longitudinally extending slot adjacent said sheet, said sheet being provided with a longitudinally extending looped portion extending through said slot, and longitudinally extending rod means preventing withdrawal of said looped portion through said slot, whereby said sheet is restrained from flexing.

4. A filter as defined in claim 3, wherein said looped portion of said sheet comprises a longitudinally extending sleeve through which said retaining means passes.

5. In a filter for cleaning dust-laden gas, a filter element comprising a frame provided with an open area, a pair of fabric sheets disposed on opposite sides of said frame across said open area, supporting means supported by said frame adjacent said sheets and defining a pair of longitudinally extending slots, one of said slots being disposed adjacent one of said sheets, and the other of said slots being disposed adjacent the other of said sheets, each of said sheets being provided with a longitudinally extending looped portion extending through an adjacent slot, and a pair of longitudinally extending rods, each of said rods preventing withdrawal of one of said looped portions through the slot adjacent thereto, whereby said fabric sheets are prevented from flexing either toward or away from each other.

6. A filter as defined in claim 5, wherein said looped portion of each sheet comprises a longitudinally extending sleeve through which a rod passes, the sleeves being provided on said sheets on the sides facing each other.

7. A filter as defined in claim 5, including means for adjusting said frame to increase at least one dimension of said open area, said supporting means extending transversely of said dimension.

8. A filter as defined in claim 5, wherein the width of each slot is less than the width of each rod with the looped portion of the fabric sheet thereabout, whereby said looped portion is prevented from leaving said slot until said rod is withdrawn.

References Cited in the file of this patent

UNITED STATES PATENTS

| | | |
|---|---|---|
| 1,747,131 | Parsons | Feb. 11, 1930 |
| 1,806,513 | Straus-Scharina | May 19, 1931 |
| 2,255,519 | Preston | Sept. 9, 1941 |
| 2,507,335 | Donohue | May 9, 1950 |
| 2,594,957 | Martens | Apr. 29, 1952 |

FOREIGN PATENTS

| | | |
|---|---|---|
| 296,128 | Germany | Jan. 13, 1917 |
| 598,428 | Great Britain | Feb. 18, 1948 |
| 907,146 | Germany | Mar. 22, 1954 |